United States Patent
Dhuse et al.

(12)

(10) Patent No.: US 10,719,499 B2
(45) Date of Patent: Jul. 21, 2020

(54) ESTABLISHING DISTRIBUTED CONSENSUS VIA ALTERNATE VOTING STRATEGIES IN A DISPERSED STORAGE NETWORK

(71) Applicant: International Business Machines Corporation, Armonk, NY (US)

(72) Inventors: Greg R. Dhuse, Chicago, IL (US); Ravi V. Khadiwala, Bartlett, IL (US); Ethan S. Wozniak, Park Ridge, IL (US)

(73) Assignee: INTERNATIONAL BUSINESS MACHINES CORPORATIOb, Armonk, NY (US)

( * ) Notice: Subject to any disclaimer, the term of this patent is extended or adjusted under 35 U.S.C. 154(b) by 1046 days.

(21) Appl. No.: 15/174,683

(22) Filed: Jun. 6, 2016

(65) Prior Publication Data

US 2017/0352218 A1    Dec. 7, 2017

(51) Int. Cl.
*G06F 16/23* (2019.01)
*G07C 13/00* (2006.01)
*H04L 9/08* (2006.01)

(52) U.S. Cl.
CPC ......... *G06F 16/2343* (2019.01); *G07C 13/00* (2013.01); *H04L 9/0894* (2013.01); *H04L 2209/463* (2013.01)

(58) Field of Classification Search
CPC . G07C 13/00; H04L 9/0894; H04L 2209/463; G06F 16/2343
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Miranda Le
(74) *Attorney, Agent, or Firm* — James Nock; Andrew D. Wright; Roberts Calderon Safran & Cole, P.C.

(57) ABSTRACT

A method includes generating a first lock requests, each for transmission to a storage unit, where each first lock request indicates a first encoded data slice. First ballots are received, each of the first ballots corresponds to a storage unit, each of the first ballots indicates a first ranking of first requesting entities that includes the DST processing unit. First election result data is generated based on the first ballots. The first election result data indicates a first winner. When the first winner is the DST processing unit, slice access requests are generated in response to the first election result data indicating that the first winner is the DST processing unit, each for transmission to one of the storage units, where each of the slice access requests indicates the first encoded data slice.

16 Claims, 4 Drawing Sheets

(56) References Cited

U.S. PATENT DOCUMENTS

| | | | |
|---|---|---|---|
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,512,748 | B1* | 3/2009 | Mason .................. G06F 9/524 711/151 |
| 7,636,724 | B2 | 12/2009 | de la Torre et al. |
| 7,921,169 | B2* | 4/2011 | Jacobs ................ H04L 12/1868 709/206 |
| 8,005,888 | B2* | 8/2011 | Lamport ................. G06F 9/542 709/201 |
| 8,560,524 | B2* | 10/2013 | Kingsbury .......... G06F 16/1774 707/718 |
| 8,788,530 | B2* | 7/2014 | Lacapra .................. G06F 16/13 707/783 |
| 9,201,742 | B2* | 12/2015 | Bulkowski ........... G06F 11/183 |
| 9,256,501 | B1* | 2/2016 | Rahut ................. G06F 11/1425 |
| 9,507,788 | B2* | 11/2016 | Pavlov ................ G06F 11/1076 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0069868 | A1* | 4/2003 | Vos ........................ G06Q 10/10 706/45 |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2012/0328104 | A1* | 12/2012 | Tagawa ................ H04L 9/0894 380/277 |
| 2017/0116095 | A1* | 4/2017 | Schatz ................ G06F 11/2033 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

ESTABLISHING DISTRIBUTED CONSENSUS VIA ALTERNATE VOTING STRATEGIES IN A DISPERSED STORAGE NETWORK

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
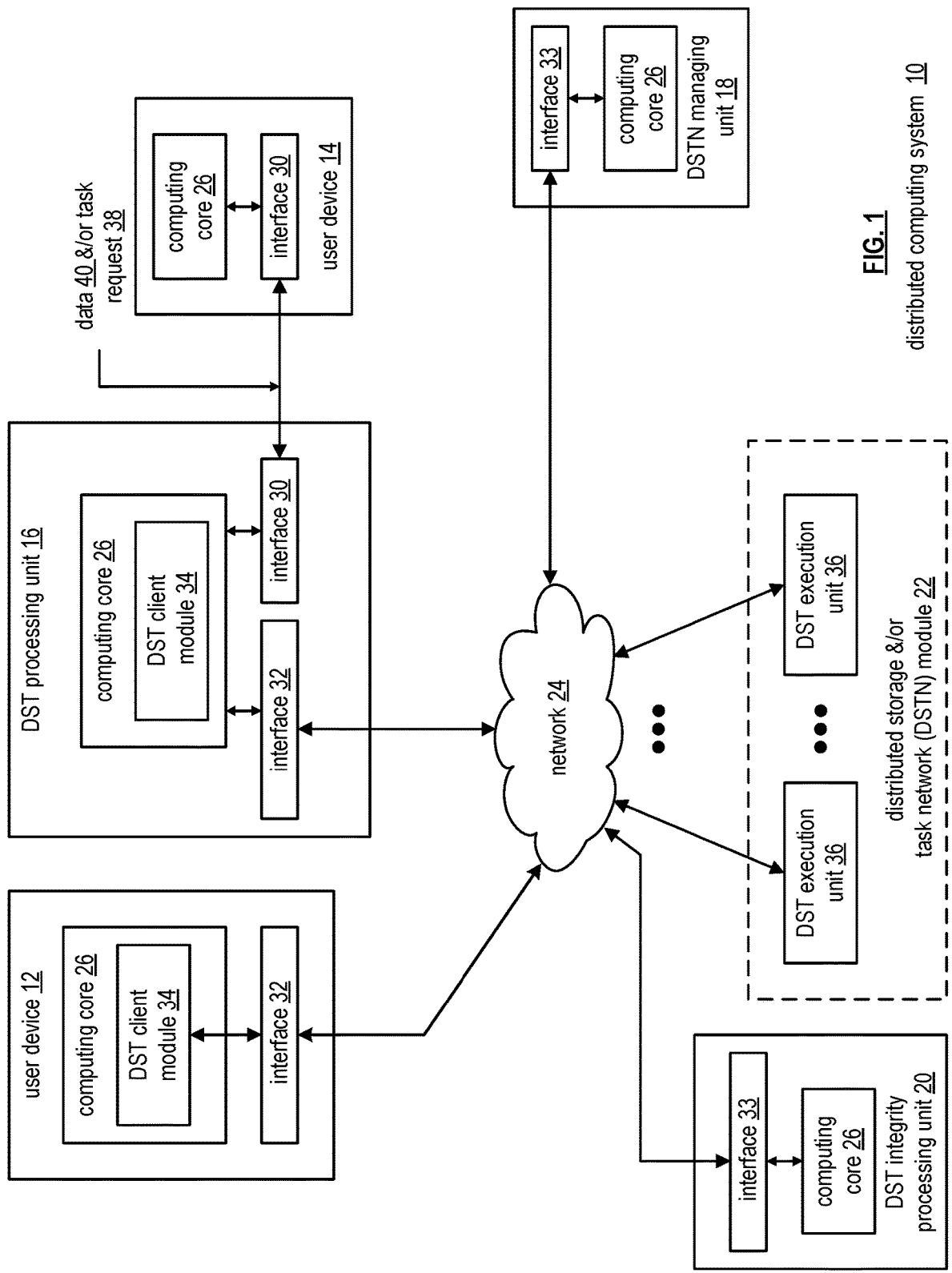
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34. While only one DST processing unit 16 is depicted in FIG. 1, the DSN can include a plurality of DST processing units 16, all connected to network 24.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

In various embodiments, data sent to a DST processing unit for storage by a user device 12-14 can include one or more data objects. Each data object can have a unique, corresponding object identifier, object name, or object ID. In various embodiments, the object ID can be generated deterministically based on the data object itself, generated based on the user device, generated sequentially, and/or generated randomly. The object ID can be generated by the user device or requesting entity, or can be generated by the DST processing unit after the data is received from the user device. A set of encoded data slices can be generated to store a particular data object, where the set of encoded data slices corresponding to the data object are stored in one or more storage units. A subset of the encoded data slices can be decoded to regenerate the original data object.

Figure 2:
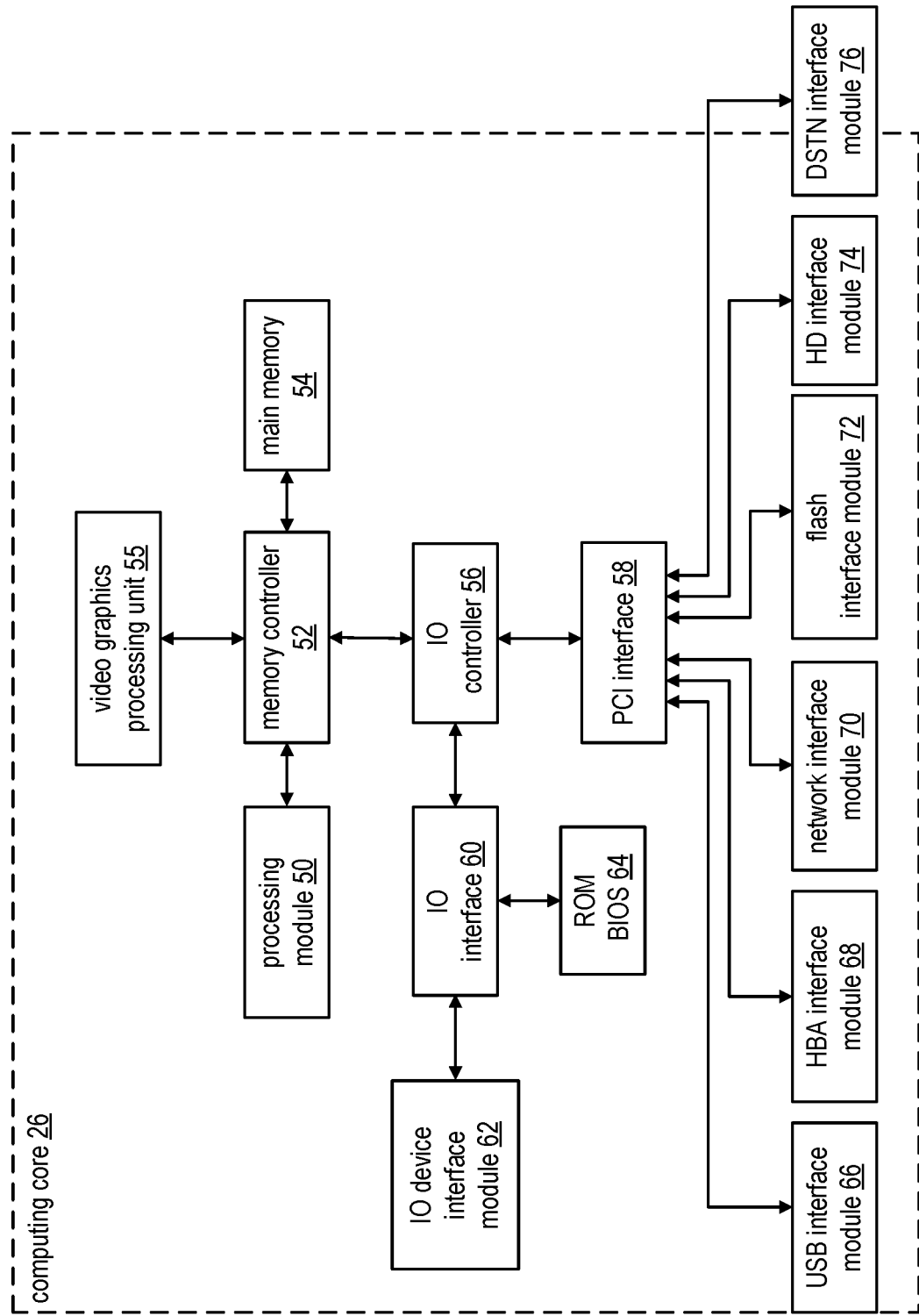
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
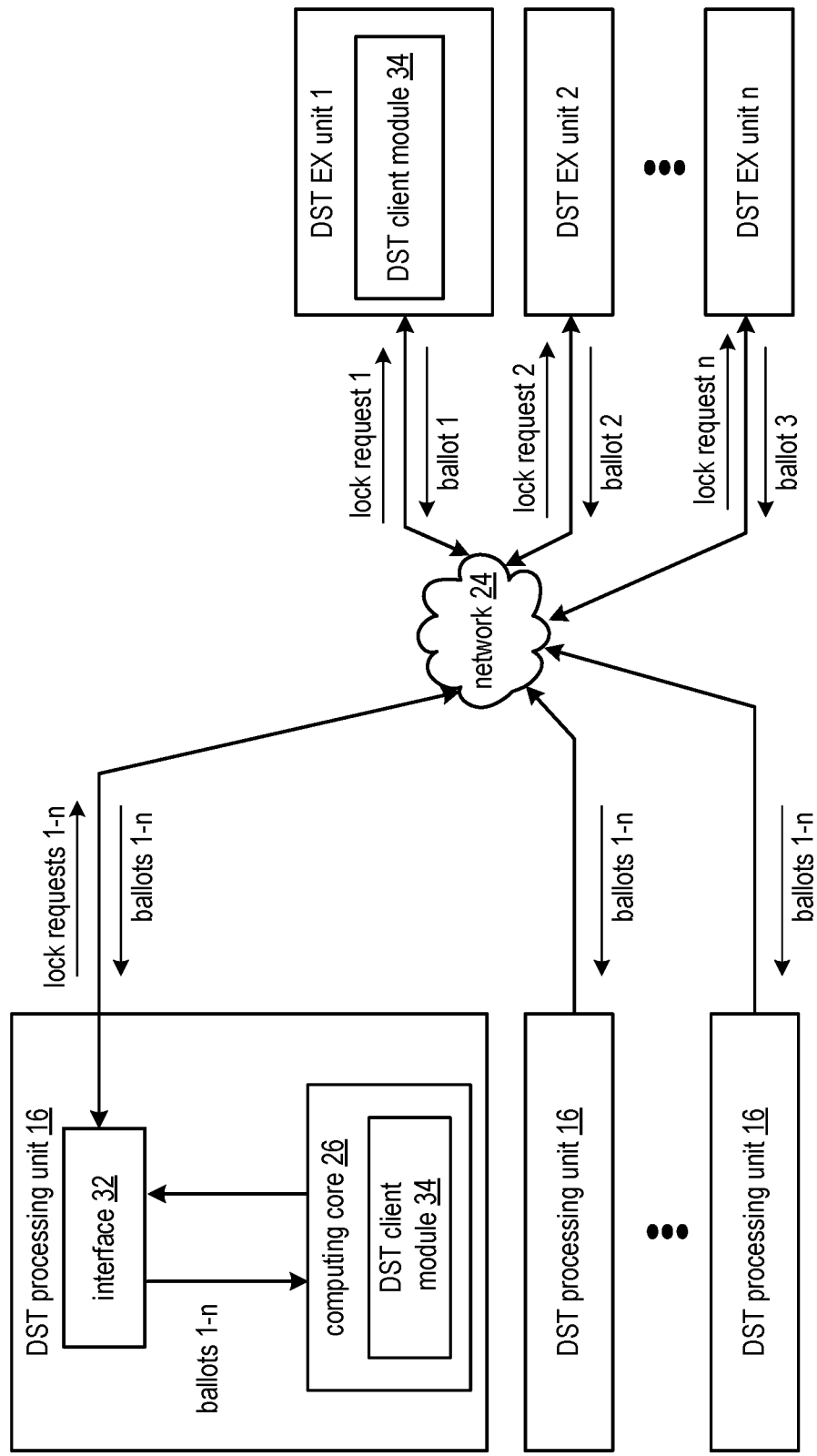
FIG. 3 is a schematic block diagrams of an embodiment of a dispersed storage network (DSN) in accordance with the present invention.

FIG. 3 is a schematic block diagram of another embodiment of a dispersed storage network (DSN) that includes a plurality of distributed storage and task (DST) processing unit 16 of FIG. 1, the network 24 of FIG. 1, and a plurality of DST execution (EX) units 1-n. Each DST processing unit 16 can include the interface 32 of FIG. 1, the computing core 26 of FIG. 1, and the DST client module 34 of FIG. 1. Each DST execution unit includes the DST client module 34 of FIG. 1. Hereafter, each DST execution unit may be interchangeably referred to as a storage unit. Each DST execution unit may be implemented utilizing the DST execution unit 36 of FIG. 1. The DSN functions to establish distributed consensus via alternate voting strategies.

In various embodiments, the DSN can have multiple entities generating slice access requests to storage units. In such embodiments, the multiple entities can be, for example, multiple DST processing units connected to the network, each receiving access requests from one or more user devices 12-14, and each generating slice access requests to one or more storage units in response. The DSN can employ distributed concurrency strategies to ensure that storage units do not perform conflicting transactions and/or tasks. A conflicting transaction and/or task can include, for example, a first DST processing unit attempting to write to a slice currently being read by a second DST processing unit. Because accessing a data object in the DSN can include accessing multiple slices of the data object which may be stored in different storage units, transactions and/or tasks to two different slices in two different storage units that correspond to the same data object can also be conflicting.

To ensure concurrency, a commit strategy can be utilized in the DSN. The commit strategy can include a lock-based protocol, an atomic protocol, and/or a consensus protocol. For example, a two-phase commit protocol or an optimistic concurrency protocol can be utilized. In particular, if the frequency of conflicts in transactions, updates, and/or other operations is rare, a quorum-based optimistic concurrency protocol can operate efficiently in the DSN. For example, a DST processing unit can attempt to gain a write-lock on a slice on at least a write threshold number of storage units. However, when there is a large number of entities contending to update the same object in a short period of time, an approach such as optimistic concurrency can become highly inefficient and very likely to fail if no single entity is able to succeed among a quorum. If no entity is able to gain a quorum, for example, because no majority is established, in then no progress is made, and the conflicts continue as the contending entities all attempt to make progress. In various embodiments, an Alternate Voting Strategy (AVS) such as Instant-Runoff voting, Borda voting, Condorcet voting, and/ or other alternate methods can be utilized in a commit and/or concurrency strategy to overcome this limitation by enabling a conflicting entity to be established as a winner in situations where a simple quorum vote would not yield any winner. This can be accomplished, for example, by utilizing a collection of rankings, scores, or sorted lists from the storage units rather than a binary "yes" or "no".

An entity such as a DST processing unit wishing to perform a transaction and/or task on at least one slice stored in and/or distributed amongst at least one storage unit can seek an exclusive lock on the at least one slice by requesting ballots from at least one storage unit. In some embodiments, the DST processing unit can generate lock requests to request ballots from only the at least one storage unit where the at least one slice is stored. In other embodiments, the DST processing unit can request the ballots from additional storage units as well. For example, the DST processing unit can request the ballots from all of the storage units in the DSN.

Each storage unit, upon receiving the exclusive lock request from the DST processing unit, can generate its own ballot in response, indicating a ranking that includes the DST processing unit and other entities for transmission back to the requesting DST processing unit. The other entities included in the ballot can include other DST processing units in the DSN and/or other entities that can access slices stored in the storage unit. In various embodiments, the ballot includes only additional entities that are also currently requesting an exclusive lock to one or more of the same slices. In various embodiments, the ranking can include individual scores assigned to individual DST processing units, or can be in the form of a sorted list. In various embodiments, the ballot is generated based on the Instant-Runoff voting method, the Borda voting method, and/or the Condorcet voting method. In various embodiments, the ballot is also transmitted to the other entities included in the ranking, even if the storage unit did not receive an exclusive lock request from those entities at that time.

Upon receiving a ballot from each storage unit that received an exclusive lock request, the DST processing unit can then determine from the ballots it receives whether it "won" the election and should proceed with locks against the source, or whether to back-off/defer to the winner. Determining the outcome of the election can include utilizing the Instant-Runoff voting method, the Borda voting method, and/or the Condorcet voting method on the received ballots. In various embodiments, the set of ballots received by one entity requesting access is the same as the set of ballots received by every entity involved in the election. For example, the same subset of storage units received exclusive lock requests because every entity involved in the election was seeking access to the same slice and/or data object. Therefore, in such embodiments, the DST processing units involved in the election can determine the same winner. Because all DST processing units involved determine the same winner, concurrency can be achieved because the winning DST processing unit will determine it has received the exclusive lock, and the losing DST processing units will yield to the winner.

In various embodiments, a DST processing unit that determines that it has won the election can enter a commit mode and perform the access. In various embodiments, the commit mode can include transmitting a completion notification to the storage units storing the slices of the access request after the transaction and/or task has been completed and that the exclusive lock has been lifted. In various embodiments, a DST processing unit can enter an abort mode after determining that it did not win the election. In various embodiments, the abort mode can include waiting to send the access request until the DST processing unit exits the abort mode and enters the commit mode. The abort mode can include resending the exclusive lock request to the at least one storage unit immediately or after a fixed timeout period.

In various embodiments, a DST processing unit can determine a first runner-up of the election from the received ballots. A winning DST processing unit can transmit a notification to a first runner-up unit directly in response to completing the transaction and/or task, and thus in response to yielding the exclusive lock and/or exiting commit mode. Alternatively, for example because DST processing units may not be able to communicate directly, the winning DST processing unit can include an indication of the first runner-up in an access request to the storage units as part of the transaction and/or task, and/or in a notification to the storage unit indicating that the transaction and/or task has been completed. In response, each storage unit can generate a transmission to the first runner-up indicating that the winning DST processing unit has lifted the exclusive lock and that the it is the first runner-up's turn to perform their access request. In such an embodiment, a DST processing unit that has identified itself as a first runner-up in an election can wait for transmissions from the all storage units involved in the access request indicating that it is their turn for the exclusive lock on the slices. In various embodiments, this strategy can be used to facilitate turn-based access to the slices for some or all of the entities involved in the election. In various embodiments, the winning DST processing unit can include complete, ranked election results to the storage units, and the storage units can notify each entity when it is their turn for the exclusive lock. In various embodiments, each DST processing unit can provide an indication of only the next runner-up behind them when they perform their access request, each storage unit can transmit a notification to the next runner-up when the DST processing unit indicating it is their turn for the exclusive lock, and the process can be repeated until all runner-ups have consecutively received an exclusive lock and completed their transaction and/or task.

In various embodiments, strategies such as Instant-Runoff voting may not yield winners directly in the first round, but can eliminate definite losers, and eventually a consensus can be made, enabling forward progress. For example, a first set of entities can request an exclusive lock, receive a set of corresponding ballots, and generate election results that indicate a subset of finalist entities. The finalist entities can send a second request for the exclusive lock back to the corresponding storage units, and the entities that are not finalists and have been eliminated as definite losers can yield to the finalists. The storage units will receive only requests from the finalist entities, which can affect the rankings provided in their ballot in this second round of the election. This process can be repeated until a single winner is determined.

In various embodiments, a storage unit can receive a lock request from a DST processing unit for at least one slice that is currently locked by another entity. In various embodiments, the storage unit can include a lock indication in a transmission back to the DST processing unit indicating that an exclusive lock is already being held on at least one of the same slices indicated in the ballot request. This lock indication can be included in the ballot, or be transmitted instead of the ballot. In various embodiments, the indication of an exclusive lock held by another entity acts as an automatic override of the request, and the DST processing unit automatically can abort the request regardless of the collective election result across all the ballots received from all the storage units. In various embodiments, the DST processing unit can wait for a fixed timeout period to resend the ballot request. In various embodiments, the storage unit can wait until the exclusive lock is lifted by the current entity before generating and transmitting its ballot. In other embodiments, the storage unit can instead send a notification that the lock as been lifted to the DST processing unit, and the DST processing unit can resend the ballot request in response to the notification that the lock has been lifted.

In various embodiments, the ballot generated by each storage unit includes a ranking of entities, which can include scores and/or a sorted list. In various embodiments, each storage unit can generate the ballot based on a deterministic function. In various embodiments, each storage unit can generate their ballots based on the same set of rules, or based on different sets of rules. In various embodiments, each storage unit can generate the ranking based on performance and/or capacity considerations. In various embodiments, each storage unit can store a ranking of possible entities, which can include separate rankings for each slice/or data object, or a universal ranking of possible entities. A storage unit can generate their ballot based on the stored fixed rankings. In various embodiments, the stored rankings can be assigned by the storage unit, or by an originating DST processing unit and/or user device upon the first write to memory. In various embodiments, each storage unit can store a recent access cache. The ranking can be determined based on how recently each entity access the storage unit, how recently at least one slice and/or data object indicated in the current ballot request were accessed by each entity, and/or a number of accesses each entity has made recently to the storage unit, the at least one slice indicated in the current lock request, and/or a data object indicated in the current ballot request. In various embodiments, the DST processing unit can include an urgency indicator in the ballot request that can include a binary value or a score, and the entity can base the ranking on incoming urgency indicators from one or more of the entities.

In various embodiments, a storage unit can keep track of "losing" entities of an election, and use this information to rank entities when generating their ballot in future elections. For example, a storage unit can determine the winner of an election based on which entity performs the access after transmitting a ballot to one or more entities. The storage unit can determine that other requesting entities included on their ballot lost the election, and can, for example, store these entities in a cache of lock requests. In future elections, determining the ranking can include ranking entities included in the lock request cache higher than entities not included in the lock request cache. In various embodiments, the ranking can further be determined based on an ordering in the lock request cache, timestamp indicating the time of the lock request in lock request cache entries, and/or the number of times each entity appears in the lock request cache. The lock request cache can also include which slices were included in the lock request, and in various embodiments, the storage unit can consider only entries of the lock request cache corresponding to the slice or slices indicated in the current lock request. In various embodiments, the winner of the election can provide election results to the storage unit in an access request when performing the transaction and/or task. The election results can include a ranking of runner-ups to the election, which can further be included in the lock request cache and/or used to generate rankings in future elections.

In various embodiments, a storage unit can determine the candidates of an election to be included on their ballot for transmission at least one entity based on the entities currently requesting an exclusive lock on one or more slices. As expecting a plurality of lock requests in the same instant of time may be unreasonable, in various embodiments the storage unit can wait a fixed amount of time to determine the contending entities in an election. In various embodiments, the storage unit can have fixed windows of time where lock requests can be received, and can generate and transmit its ballot at the end of the fixed window. In various embodiments, a fixed time period can start when the first request is received, and the storage unit can generate and transmit the ballot at the end of the fixed period. In various embodiments, the period of time that a storage unit waits for ballots can be variable and based on, for example, how frequently the storage unit is receiving access requests, performance considerations, and/or storage considerations. In various embodiments, a fixed contender limit can be set indicating the maximum number of contenders that a storage unit will include in the ballot, and the storage unit can generate and transmit the ballot when the contender limit is met.

A processing system of a dispersed storage and task (DST) processing unit includes at least one processor and a memory that stores operational instructions, that when executed by the at least one processor cause the processing system to generate a first plurality of lock requests, each for transmission via a network to one of a first plurality of storage units, where each of the first plurality of lock requests indicates at least one of a first plurality of encoded data slices. A first plurality of ballots is received via the network, each of the first plurality of ballots corresponds to one of the first plurality of storage units, each of the first plurality of ballots indicates one of a first plurality of rankings of a first plurality of requesting entities, and the first plurality of requesting entities includes the DST processing unit itself. First election result data is generated based on the first plurality of ballots. The first election result data indicates a first winner, and the first winner is the DST processing unit. A plurality of slice access requests are generated in response to the first election result data indicating that the first winner is the DST processing unit, each for transmission via the network to one of the first plurality of storage units, where each of the plurality of slice access requests indicates the at least one of the first plurality of encoded data slices.

In various embodiments, generating the first election result data is includes determining the first winner based on an Instant-Runoff voting strategy, a Borda voting strategy, and/or a Condorcet voting strategy. In various embodiments, each of the first plurality of requesting entities receives the first plurality of ballots, and each of the first plurality of requesting entities determines that the DST processing unit is the first winner of the first election. In various embodiments, each of the first plurality of ballots further includes a score corresponding to each of the first plurality of requesting entities, and generating the first election result data is based on the score of the each of the first plurality of ballots. In various embodiments, the first election result data further indicates a first runner-up, and wherein the plurality of slice access requests transmitted to the first plurality of storage units each further indicate the first runner-up.

In various embodiments, a one of the first plurality of rankings corresponding to a one of the first plurality of storage units is based on a plurality of recent lock attempts, each corresponding to at least one of the first plurality of encoded data slices by at least one of the first plurality of requesting entities. A first one of the plurality of recent lock attempts corresponds to a first one of the first plurality of requesting entities, a second one of the plurality of recent lock attempts corresponds to a second one of the first plurality of requesting entities, and the first one of the plurality of recent lock attempts is more recent than the second one of the plurality of recent lock attempts, and as a result, the first one of the first plurality of requesting entities is ranked higher than the second one of the first plurality of requesting entities in the one of the first plurality of rankings. In various embodiments, a one of the first plurality of rankings is based on a result of a recent election, the result of the recent election includes a first one of the plurality of requesting entities that is ranked higher than a second one of the plurality of requesting entities, and as a result, the first one of the plurality of requesting entities is ranked higher in the one of the first plurality of rankings than the second one of the plurality of requesting entities.

In various embodiments, a second plurality of lock requests are generated, each for transmission via the network to one of a second plurality of storage units, where each of the second plurality of lock requests indicates at least one of a second plurality of encoded data slices. A second plurality of ballots are received via the network. Each of the second plurality of ballots corresponds to one of the second plurality of storage units, each of the second plurality of ballots indicates one of a second plurality of rankings of a second plurality of requesting entities, and the second plurality of requesting entities includes the DST processing unit itself. Second election result data is generated based on the second plurality of ballots. The second election result data indicates a second winner, and the second winner is not the DST processing unit. An abort mode is entered in response to the second election result data indicating that the second winner is not the DST processing unit, wherein the DST processing unit transmits no slice access requests indicating any of the second plurality of encoded data slices to any of the first plurality of storage units while in the abort mode. In various embodiments, the abort mode is exited by retransmitting the second plurality of lock requests to the second plurality of storage units after predetermined timeout period has passed.

In various embodiments, the second election result data further indicates a second runner-up, and the second runner-up is the DST processing unit. A lock notification is received from each of the second plurality of storage units and in response, the abort mode is exited and a plurality of slice access requests are generated, each for transmission via the network to one of the second plurality of storage units.

In various embodiments, the concurrency strategy can include determining that overlapping write requests for a set of encoded data slices having the same set of slice names occurs. Overlapping write requests can occur when one set of write requests is pending (e.g., write finalize commands have not yet been issued) and another set of write requests for a set of encoded data slices having the same set of slice names is received by the storage units. For example, computing devices A and B send overlapping write requests regarding a set of encoded data slices with the same set of slices names. Computing devices A and B can be, for example user devices 12-14. The computing device can also be a DST processing unit 16. To process overlapping write requests (and other overlapping data access requests), each storage unit can store its own proposal record for a slice name or for a group of slice names. A proposal record includes an order listed of pending transactions and an ordered list of visible and different versions of an encoded data slice (EDS) have the same slice name. The proposal record can further include an indication of the current revision level of the encoded data slice.

In various embodiments, the ordered list of pending transactions can include a time ordered list of transaction numbers, or other indication, associated with data access requests regarding the slice name that were received while the proposal record is open (e.g., write finalize commands have not yet been issued for one of the pending write requests). For example, the proposal record of a storage unit includes an ordered list of transaction numbers for data access requests regarding a first slice name of a set of slice names.

As a specific example, a first write request from computing device A regarding a version of an encoded data slice having the first slice name has a first transaction number (e.g., 0413) and a second write request from computing device B regarding another version of the encoded data slice having the first slice name has a second transaction number (e.g., 0279). A storage unit #1 can receive the first write request before receiving the second write request, as such the proposal record has the first write request (e.g., the first transaction number) in a first priority position and the second write request in a second priority position.

As another specific example, a write request from computing device A regarding a version of an encoded data slice having a second slice name has the first transaction number (e.g., 0413) and a write request from computing device B regarding another version of the encoded data slice having the second slice name has the second transaction number (e.g., 0279). A storage unit #2 can receive the write request from computing device B before receiving the write request from computing device A. As such, the proposal record has the write request of computing device B (e.g., the second transaction number) in the first priority position and the write request from computing device A in a second priority position. The remaining storage units generate their respective proposal records in a similar manner.

In various embodiments, a storage unit "opens" a proposal record when it receives a new write request for a version of an encoded data slice having a slice name (i.e., no other write requests are pending). The storage unit sends to proposal record to the computing device sending the write request. If there are no overlapping write requests for a set of encoded data slices having a set of slice names, then the other storage units can open up proposal records and send them to the computing device.

In various embodiments, the computing device can interpret the proposal records to determine whether a threshold number, or more, (e.g., decode threshold number, write threshold number, etc.) of its write requests is in the first priority position. When there is not an overlapping write request, the write requests will be in the first priority position. As such, the computing device sends finalize requests to the storage units. The storage units can process the finalize request to make the new version of the encoded data slices as the most recent set of encoded data slices and close their respective proposal records.

In various embodiments, when there is an overlapping write request (e.g., a storage unit has an open proposal record for the slice name), the storage unit can update the proposal record with the new write request by placing the new write request is a lower priority position than previously received and pending write requests. After updating the proposal record, the storage unit sends the proposal record to the computing device that sent the new write request. As the computing devices or DST processing unit receive the proposal records, it can determine whether at least the threshold number of their respective write requests are in first priority position. If yes, the computing device issues the finalize commands. If not, the computing device or DST processing unit withdraws its write requests or executes some other fallback position.

In addition to the two write requests, a computing device C, which can be a user device 12-14 or a DST processing unit 16, can send read requests to the storage units for the set of encoded data slices. The storage units can add the read requests to their respective proposal records and send the updated proposal records to computing device C. Upon receiving the proposal records, computing device C can determine whether to proceed with the read request (e.g., read the current revision level of the set of encoded data slices) or terminate the read request. As an alternative, computing device C processes the proposal records to determine that the new set of encoded data slices from computing device A or computing device B will be the next current version of the set of encoded data slices. Having made this determination, computing device C modifies its read requests to read the next current version of the set of encoded data slices.

In various embodiments, the write request can include a transaction number field, a slice name (SN) field, an encoded data slice (EDS) field, a current revision level field, and/or a new revision level field. Each write request in the set of write requests can include the same transaction number, a different slice name, a different EDS, the same current revision level, and the same new revision level. In various embodiments, a read request can include a transaction number field, a slice name (SN) field, and/or a current revision level field. Each read request in a set of read requests can include the same transaction number, a different slice name, and the same current revision level.

In various embodiments, write requests and the read requests are sent out at similar times, due to differing latencies and/or processing capabilities between the computing devices and storage units, and can the requests are received at different times and, potentially in a different order, by the storage units than the order in which they were transmitted. Prior to the reception of any of the read or write requests, the storage units can store a current revision level of the set of encoded data slices. In various embodiments, each of the storage units do not have a proposal record open for their respective encoded data slice.

In various embodiments, when a storage unit receives a data access request, it opens a proposal record that identifies the data access it just received, the current revision level, and an indication that the current revision level of the encoded data slice is visible (e.g., can be accessed by a computing device of the DSN). Upon opening a proposal record, the storage unit sends it to the computing device from which it received the request.

In various embodiments, a computing device sends data access requests to storage units of the DSN regarding a set of encoded data slices. The data access request may be read requests or write requests for a set of encoded data slices. The computing device can determine whether a transaction is pending for the set of encoded data slices (e.g., a write request and/or a read request is listed in an open proposal record). As described above, the receipt of a write request triggers the opening of a proposal record by a storage unit. A storage unit can open the proposal record upon receipt of a read request. The computing device can determine that a transaction is pending when it receives a proposal record from one or more storage units.

In various embodiments, if a transaction is not pending, the computing device can receive a response to the data access request. For example, the computing device receives a slice name list in response to a list request. As another example, the computing device receives a status indication in response to a status request. When a transaction is pending, the computing device can receive the proposal records from the storage units. The computing device can interpret the proposal records to determine an ordering of visible versions of the set of encoded data slices stored by the storage units.

In various embodiments, the computing device can determine whether a threshold number of encoded data slices of a desired version of the set of encoded data slices is visible and of priority. The computing device A can determine that it has a threshold number of its encoded data slices visible and of priority while computing device B cannot. If not, the computing device can determine whether it receives updated proposal records, which may be in response to a request for updated proposal records or received in response to another data access request being received by the storage units. For example, when a computing device determines that no one computing device has a threshold number of encoded data slices in the first priority position, the computing device may implement a fallback plan to reissue the data access request. Accordingly, the storage units would issue updated proposal records. If not, the computing device can issue an undo request to withdraw its data access request.

When the threshold number of encoded data slices of a desired version of the set of encoded data slices is visible and of priority, the computing device can determine whether to proceed with the data access request. If not, the computing device issues an undo request. If yes, the computing device can send a request to proceed with the data access request to the storage units.

Figure 4:
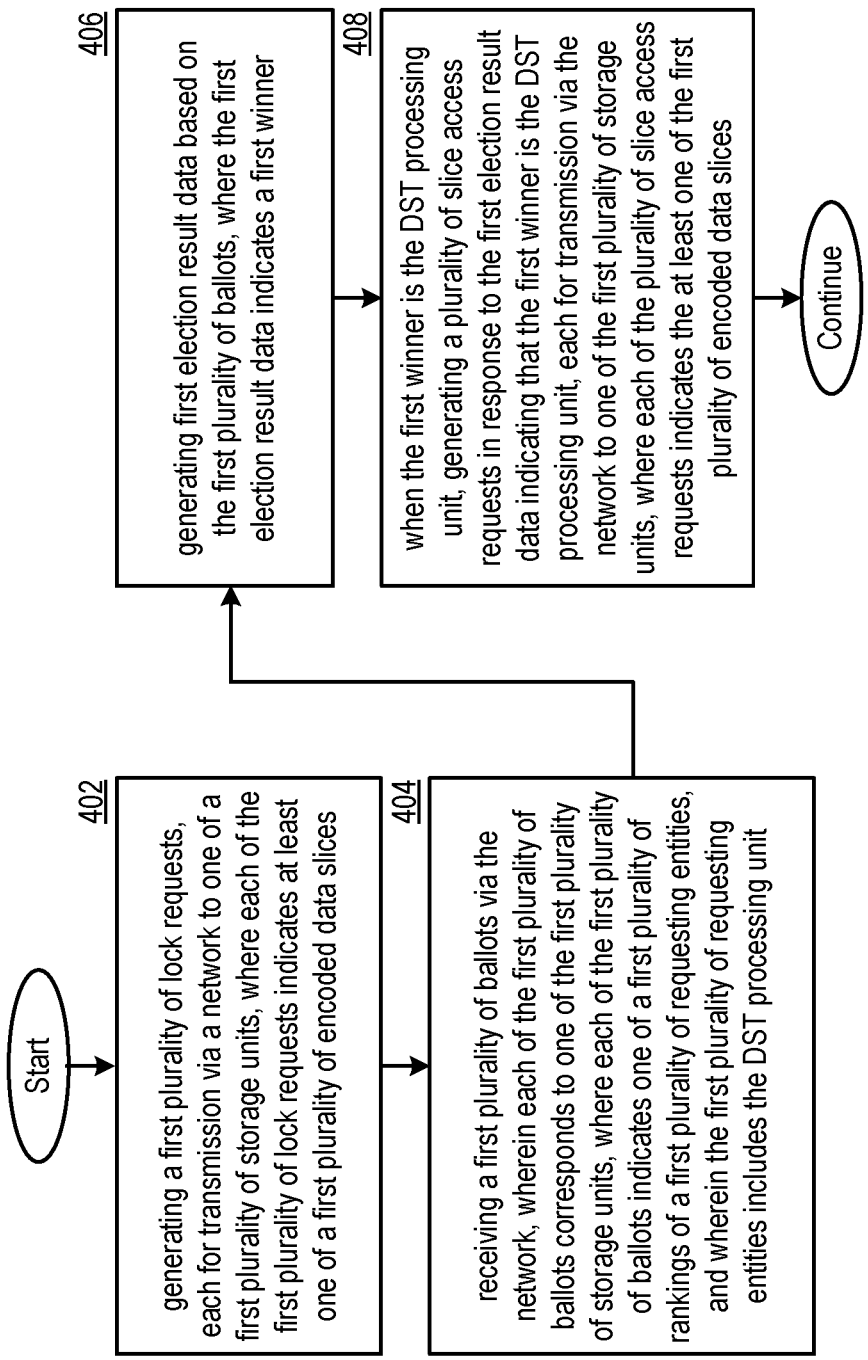
FIG. 4 is a flowchart illustrating an example of establishing distributed consensus via alternate voting strategies in accordance with the present invention.

FIG. 4 is a flowchart illustrating an example of establishing distributed consensus via alternate voting strategies. In particular, a method is presented for use in conjunction with one or more functions and features described in conjunction with FIGS. 1-3 is presented for execution by a dispersed storage and task (DST) execution unit that includes a processor or via another processing system of a dispersed storage network that includes at least one processor and memory that stores instruction that configure the processor or processors to perform the steps described below. Step 402 includes generating a first plurality of lock requests, each for transmission via a network to one of a first plurality of storage units, where each of the first plurality of lock requests indicates at least one of a first plurality of encoded data slices. Step 404 includes receiving a first plurality of ballots via the network, where each of the first plurality of ballots corresponds to one of the first plurality of storage units, where each of the first plurality of ballots indicates one of a first plurality of rankings of a first plurality of requesting entities, and where the first plurality of requesting entities includes the DST processing unit itself. Step 406 includes generating first election result data based on the first plurality of ballots, where the first election result data indicates a first winner, and where the first winner is the DST processing unit. Step 408 includes generating a plurality of slice access requests in response to the first election result data indicating that the first winner is the DST processing unit, each for transmission via the network to one of the first plurality of storage units, where each of the plurality of slice access requests indicates the at least one of the first plurality of encoded data slices.

In various embodiments, generating the first election result data is includes determining the first winner based on an Instant-Runoff voting strategy, a Borda voting strategy, and/or a Condorcet voting strategy. In various embodiments, each of the first plurality of ballots further includes a score corresponding to each of the first plurality of requesting entities, and generating the first election result data is based on the score of the each of the first plurality of ballots. In various embodiments, the first election result data further indicates a first runner-up, and wherein the plurality of slice access requests transmitted to the first plurality of storage units each further indicate the first runner-up.

In various embodiments, a one of the first plurality of rankings corresponding to a one of the first plurality of storage units is based on a plurality of recent lock attempts, each corresponding to at least one of the first plurality of encoded data slices by at least one of the first plurality of requesting entities. A first one of the plurality of recent lock attempts corresponds to a first one of the first plurality of requesting entities, a second one of the plurality of recent lock attempts corresponds to a second one of the first plurality of requesting entities, and the first one of the plurality of recent lock attempts is more recent than the second one of the plurality of recent lock attempts, and as a result, the first one of the first plurality of requesting entities is ranked higher than the second one of the first plurality of requesting entities in the one of the first plurality of rankings. In various embodiments, a one of the first plurality of rankings is based on a result of a recent election, the result of the recent election includes a first one of the plurality of requesting entities that is ranked higher than a second one of the plurality of requesting entities, and as a result, the first one of the first plurality of requesting entities is ranked higher in the one of the first plurality of rankings than the second one of the plurality of requesting entities.

In various embodiments, a second plurality of lock requests are generated, each for transmission via the network to one of a second plurality of storage units, where each of the second plurality of lock requests indicates at least one of a second plurality of encoded data slices. A second plurality of ballots are received via the network. Each of the second plurality of ballots corresponds to one of the second plurality of storage units, each of the second plurality of ballots indicates one of a second plurality of rankings of a second plurality of requesting entities, and the second plurality of requesting entities includes the DST processing unit itself. Second election result data is generated based on the second plurality of ballots. The second election result data indicates a second winner, and the second winner is not the DST processing unit. An abort mode is entered in response to the second election result data indicating that the second winner is not the DST processing unit, wherein the DST processing unit transmits no slice access requests indicating any of the second plurality of encoded data slices to any of the first plurality of storage units while in the abort mode. In various embodiments, the abort mode is exited by retransmitting the second plurality of lock requests to the second plurality of storage units after predetermined timeout period has passed.

In various embodiments, the second election result data further indicates a second runner-up, and the second runner-up is the DST processing unit. A lock notification is received from each of the second plurality of storage units and in response, the abort mode is exited and a plurality of slice access requests are generated, each for transmission via the network to one of the second plurality of storage units.

The method described above in conjunction with the computing device and the storage units can alternatively be performed by other modules of the dispersed storage network or by other devices. For example, any combination of a first module, a second module, a third module, a fourth module, etc. of the computing device and the storage units may perform the method described above. In addition, at least one memory section (e.g., a first memory section, a second memory section, a third memory section, a fourth memory section, a fifth memory section, a sixth memory section, etc. of a non-transitory computer readable storage medium) that stores operational instructions can, when executed by one or more processing modules of one or more computing devices and/or by the storage units of the dispersed storage network (DSN), cause the one or more computing devices and/or the storage units to perform any or all of the method steps described above.

In various embodiments, a non-transitory computer readable storage medium includes at least one memory section that stores operational instructions that, when executed by a processing system of a dispersed storage network (DSN) that includes a processor and a memory, causes the processing system to generate a first plurality of lock requests, each for transmission via a network to one of a first plurality of storage units, where each of the first plurality of lock requests indicates at least one of a first plurality of encoded data slices. A first plurality of ballots is received via the network, each of the first plurality of ballots corresponds to one of the first plurality of storage units, each of the first plurality of ballots indicates one of a first plurality of rankings of a first plurality of requesting entities. First election result data is generated based on the first plurality of ballots. The first election result data indicates a first winner, and the first winner corresponds to the at least one memory section. A plurality of slice access requests are generated in response to the first election result data indicating that the first winner corresponds to the at least one memory section, each for transmission via the network to one of the first plurality of storage units, where each of the plurality of slice access requests indicates the at least one of the first plurality of encoded data slices.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a dispersed storage and task (DST) processing unit that includes a processor, the method comprises:

generating a first plurality of lock requests, each for transmission via a network to one of a first plurality of storage units, wherein each of the first plurality of lock requests indicates at least one of a first plurality of encoded data slices;

receiving a first plurality of ballots from the first plurality of storage units via the network, wherein each of the first plurality of ballots was generated by a corresponding one of the first plurality of storage units, wherein each of the first plurality of ballots indicates one of a first plurality of rankings of a first plurality of requesting entities, wherein the first plurality of requesting entities are distinct from the first plurality of storage units, and wherein the first plurality of requesting entities includes the DST processing unit;

generating first election result data based on the first plurality of ballots, wherein the first election result data indicates a first winner;

when the first winner is the DST processing unit, generating a plurality of slice access requests in response to the first election result data indicating that the first winner is the DST processing unit, each for transmission via the network to one of the first plurality of storage units, wherein each of the plurality of slice access requests indicates the at least one of the first plurality of encoded data slices;

generating a second plurality of lock requests, each for transmission via the network to one of a second plurality of storage units, wherein each of the second plurality of lock requests indicates at least one of a second plurality of encoded data slices;

receiving a second plurality of ballots via the network, wherein each of the second plurality of ballots corresponds to one of the second plurality of storage units, wherein each of the second plurality of ballots indicates one of a second plurality of rankings of a second plurality of requesting entities, and wherein the second plurality of requesting entities includes the DST processing unit;

generating second election result data based on the second plurality of ballots, wherein the second election result data indicates a second winner, and wherein the second winner is not the DST processing unit; and entering an abort mode in response to the second election result data indicating that the second winner is not the DST processing unit, wherein the DST processing unit transmits no slice access requests indicating any of the second plurality of encoded data slices to any of the first plurality of storage units while in the abort mode; and exiting the abort mode by retransmitting the second plurality of lock requests to the second plurality of storage units after predetermined timeout period has passed.

2. The method of claim 1, wherein generating the first election result data includes determining the first winner based on at least one of: an Instant-Runoff voting strategy, a Borda voting strategy, or a Condorcet voting strategy.

3. The method of claim 1, wherein each of the first plurality of requesting entities receives the first plurality of ballots, and wherein each of the first plurality of requesting entities determines that the DST processing unit is the first winner of the first election.

4. The method of claim 1, wherein each of the first plurality of ballots further includes a score corresponding to each of the first plurality of requesting entities, and wherein generating the first election result data is based on the score of the each of the first plurality of ballots.

5. The method of claim 1, wherein a one of the first plurality of rankings generated by a one of the first plurality of storage units is based on a plurality of recent lock attempts, each corresponding to at least one of the first plurality of encoded data slices by at least one of the first plurality of requesting entities, wherein a first one of the plurality of recent lock attempts corresponds to a first one of the first plurality of requesting entities, wherein a second one of the plurality of recent lock attempts corresponds to a second one of the first plurality of requesting entities, and wherein the first one of the plurality of recent lock attempts is more recent than the second one of the plurality of recent lock attempts, and as a result, the first one of the first plurality of requesting entities is ranked higher than the second one of the first plurality of requesting entities in the one of the first plurality of rankings.

6. The method of claim 1, wherein a one of the first plurality of rankings is based on a result of a recent election, wherein the result of the recent election includes a first one of the plurality of requesting entities that is ranked higher than a second one of the plurality of requesting entities, and as a result, the first one of the plurality of requesting entities is ranked higher in the one of the first plurality of rankings than the second one of the plurality of requesting entities.

7. The method of claim 1, wherein the first election result data further indicates a first runner-up, and wherein the plurality of slice access requests transmitted to the first plurality of storage units each further indicate the first runner-up.

8. The method of claim 1, wherein the second election result data further indicates a second runner-up, and wherein the second runner-up is the DST processing unit, further comprising receiving a lock notification from each of the second plurality of storage units and in response, exiting the abort mode and generating a plurality of slice access requests, each for transmission via the network to one of the second plurality of storage units.

9. A processing system of a dispersed storage and task (DST) processing unit comprises:
  at least one processor;
  a memory that stores operational instructions, that when executed by the at least one processor cause the processing system to:
  generate a first plurality of lock requests, each for transmission via a network to one of a first plurality of storage units, wherein each of the first plurality of lock requests indicates at least one of a first plurality of encoded data slices;
  receive a first plurality of ballots from the first plurality of storage units via the network, wherein each of the first plurality of ballots was generated by a corresponding one of the first plurality of storage units, wherein each of the first plurality of ballots indicates one of a first plurality of rankings of a first plurality of requesting entities, wherein the first plurality of requesting entities are distinct from the first plurality of storage units, and wherein the first plurality of requesting entities includes the DST processing unit;
  generate first election result data based on the first plurality of ballots, wherein the first election result data indicates a first winner;
  when the first winner is the DST processing unit, generate a plurality of slice access requests in response to the first election result data indicating that the first winner is the DST processing unit, each for transmission via the network to one of the first plurality of storage units, wherein each of the plurality of slice access requests indicates the at least one of the first plurality of encoded data slices;
generate a second plurality of lock requests, each for transmission via a network to one of a second plurality of storage units, wherein each of the second plurality of lock requests indicates at least one of a second plurality of encoded data slices;
receive a second plurality of ballots via the network, wherein each of the second plurality of ballots corresponds to one of the second plurality of storage units, wherein each of the second plurality of ballots indicates one of a second plurality of rankings of a second plurality of requesting entities, and wherein the second plurality of requesting entities includes the DST processing unit;
generate second election result data based on the second plurality of ballots, wherein the second election result data indicates a second winner, and wherein the second winner is not the DST processing unit; and
enter an abort mode in response to the second election result data indicating that the second winner is not the DST processing unit, wherein the DST processing unit transmits no slice access requests indicating any of the second plurality of encoded data slices to any of the first plurality of storage units while in abort mode; and
exit the abort mode by retransmitting the second plurality of lock requests to the second plurality of storage units after predetermined timeout period has passed.

10. The processing system of claim 9, wherein generating the first election result data includes determining the first winner based on at least one of: an Instant-Runoff voting strategy, a Borda voting strategy, or a Condorcet voting strategy.

11. The processing system of claim 9, wherein each of the first plurality of ballots further includes a score corresponding to each of the first plurality of requesting entities, and wherein generating the first election result data is based on the score of the each of the first plurality of ballots.

12. The processing system of claim 9, wherein a one of the first plurality of rankings generated by a one of the first plurality of storage units is based on a plurality of recent lock attempts, each corresponding to at least one of the first plurality of encoded data slices by at least one of the first plurality of requesting entities, wherein a first one of the plurality of recent lock attempts corresponds to a first one of the first plurality of requesting entities, wherein a second one of the plurality of recent lock attempts corresponds to a second one of the first plurality of requesting entities, and wherein the first one of the plurality of recent lock attempts is more recent than the second one of the plurality of recent lock attempts, and as a result, the first one of the first plurality of requesting entities is ranked higher than the second one of the first plurality of requesting entities in the one of the first plurality of rankings.

13. The processing system of claim 9, wherein a one of the first plurality of rankings is based on a result of a recent election, wherein the result of the recent election includes a first one of the plurality of requesting entities that is ranked higher than a second one of the plurality of requesting entities, and as a result, the first one of the plurality of requesting entities is ranked higher in the one of the first plurality of rankings than the second one of the plurality of requesting entities.

14. The processing system of claim 9, wherein the first election result data further indicates a first runner-up, and wherein the plurality of slice access requests transmitted to the first plurality of storage units each further indicate the first runner-up.

15. The processing system of claim 9, wherein the second election result data further indicates a second runner-up, and wherein the second runner-up is the DST processing unit, and wherein the operational instructions, when executed by the at least one processor, further cause the processing system to receive a lock notification from each of the second plurality of storage units and in response, exiting the abort mode and generating a plurality of slice access requests, each for transmission via the network to one of the second plurality of storage units.

16. A non-transitory computer readable storage medium comprises:
at least one memory section that stores operational instructions that, when executed by a processing system of a dispersed storage network (DSN) that includes a processor and a memory, causes the processing system to:
generate a first plurality of lock requests, each for transmission via a network to one of a first plurality of storage units, wherein each of the first plurality of lock requests indicates at least one of a first plurality of encoded data slices;
receive a first plurality of ballots from the first plurality of storage units via the network, wherein each of the first plurality of ballots was generated by a corresponding one of the first plurality of storage units, wherein each of the first plurality of ballots indicates one of a first plurality of rankings of a first plurality of requesting entities, and wherein the first plurality of requesting entities are distinct from the first plurality of storage units;
generate first election result data based on the first plurality of ballots, wherein the first election result data indicates a first winner,
when the first winner corresponds to the at least one memory section, generate a plurality of slice access requests in response to the first election result data indicating that the first winner corresponds to the at least one memory section, each for transmission via the network to one of the first plurality of storage units, wherein each of the plurality of slice access requests indicates the at least one of the first plurality of encoded data slices;
generate a second plurality of lock requests, each for transmission via a network to one of a second plurality of storage units, wherein each of the second plurality of lock requests indicates at least one of a second plurality of encoded data slices;
receive a second plurality of ballots via the network, wherein each of the second plurality of ballots corresponds to one of the second plurality of storage units, wherein each of the second plurality of ballots indicates one of a second plurality of rankings of a second plurality of requesting entities, and wherein the second plurality of requesting entities includes the DST processing unit;
generate second election result data based on the second plurality of ballots, wherein the second election result data indicates a second winner, and wherein the second winner is not the DST processing unit; and
enter an abort mode in response to the second election result data indicating that the second winner is not the DST processing unit, wherein the DST processing unit transmits no slice access requests indicating any of the second plurality of encoded data slices to any of the first plurality of storage units while in abort mode; and
exit the abort mode by retransmitting the second plurality of lock requests to the second plurality of storage units after predetermined timeout period has passed.

\* \* \* \* \*